(12) United States Patent
Jang et al.

(10) Patent No.: US 10,198,038 B2
(45) Date of Patent: Feb. 5, 2019

(54) FOLDABLE DISPLAY DEVICE

(71) Applicant: LG Display Co., Ltd., Seoul (KR)

(72) Inventors: Se-Jin Jang, Gyeonggi-do (KR);
Noh-Jin Myung, Gyeonggi-do (KR);
Byoung-Har Hwang, Gyeonggi-do (KR);
Sang-Wook Woo, Gyeonggi-do (KR);
Tae-Hyoung Kwak, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 28 days.

(21) Appl. No.: 15/361,806

(22) Filed: Nov. 28, 2016

(65) Prior Publication Data
US 2017/0153668 A1    Jun. 1, 2017

(30) Foreign Application Priority Data

Nov. 30, 2015 (KR) .................. 10-2015-0169503
Apr. 21, 2016 (KR) .................. 10-2016-0048801
Sep. 21, 2016 (KR) .................. 10-2016-0120655

(51) Int. Cl.
*G06F 1/16* (2006.01)

(52) U.S. Cl.
CPC .......... *G06F 1/1641* (2013.01); *G06F 1/1643* (2013.01); *G06F 1/1652* (2013.01)

(58) Field of Classification Search
CPC .............................. G06F 1/1641; G09F 9/301
USPC ......................................................... 349/58
See application file for complete search history.

(56) References Cited

U.S. PATENT DOCUMENTS

| | | | |
|---|---|---|---|
| 2012/0120471 A1* | 5/2012 | Hamalainen | G09F 3/0297 359/238 |
| 2015/0049428 A1* | 2/2015 | Lee | G06F 1/1652 361/679.27 |
| 2015/0147532 A1* | 5/2015 | Nam | G02B 26/005 428/172 |
| 2015/0168612 A1* | 6/2015 | Lee | G02B 5/0221 359/599 |
| 2015/0200375 A1* | 7/2015 | Kim | G09F 9/301 257/40 |
| 2015/0257290 A1 | 9/2015 | Lee | |

(Continued)

FOREIGN PATENT DOCUMENTS

CN    104424851 A    3/2015
CN    104900149 A    9/2015

OTHER PUBLICATIONS

The First Office Action dated Sep. 5, 2018, from the State Intellectual Property Office of People's Republic of China in counterpart Chinese application No. 201611044740.0.

*Primary Examiner* — Christopher Raabe
(74) *Attorney, Agent, or Firm* — Morgan, Lewis & Bockius LLP (57) ABSTRACT

A foldable display device includes a display panel including a first surface and a second surface opposite to the first surface; and an impact absorption film adjacent to the second surface of the display panel and including first and second impact absorption layers. The second impact absorption layer includes a soft part corresponding to a first region of the second impact absorption layer and a hard part corresponding to a second region of the second impact absorption layer. The first impact absorption layer and the soft part of the second impact absorption layer have an elastic modulus value less than an elastic modulus value of the hard part.

18 Claims, 4 Drawing Sheets

(56) References Cited

U.S. PATENT DOCUMENTS

2015/0268697 A1* 9/2015 Nam ..................... G06F 1/1652
                                                    428/157
2016/0048171 A1    2/2016 Lee et al.
2016/0111678 A1*  4/2016 Lee ........................... C09J 7/00
                                                    257/40
2016/0357052 A1* 12/2016 Kim .................. G02F 1/133305

* cited by examiner

FOLDABLE DISPLAY DEVICE

The present application claims the benefit of Korean Patent Application No. 10-2015-0169503 filed in the Republic of Korea on Nov. 30, 2015, Korean Patent Application No. 10-2016-0048801 filed in the Republic of Korea on Apr. 21, 2016, and Korean Patent Application No. 10-2016-0120655 filed in the Republic of Korea on Sep. 21, 2016, all of which are hereby incorporated by reference in their entirety.

BACKGROUND

Field of Technology

The present disclosure relates to a display device, and more particularly, to a foldable display device.

Discussion of the Related Art

As information technology and mobile communication technology have been developed, a display device capable of displaying a visual image has also been developed. Flat panel display devices have been developed. For example, flat panel display devices include a liquid crystal display (LCD) device, a plasma display panel (PDP) device, a field emission display (FED) device, and an organic light emitting display (OLED) device. A flat panel display device is used instead of a cathode ray tube (CRT) because of excellent characteristics, such as thin profile, low weight, low power consumption, and the like.

Generally, a glass substrate, which is desired for high temperature fabrication processes, is used for the flat panel display device. Accordingly, there are limitations with respect to achieving a thin profile, low weight, and/or flexibility.

To overcome the limitation of the glass substrate, a flexible substrate, e.g., a plastic substrate, is used to provide a flexible display device. The flexible display device may be classified into an unbreakable display device, a bendable display device, a rollable display device and a foldable display device. Recently, among these flexible display devices, the foldable display device, which can be folded and unfolded, has been widely researched. The foldable display device is portable in a folded state, and an image is displayed in an unfolded state. The foldable display device can be used for a mobile apparatus, such as a mobile phone, an ultra mobile PC, an e-book and an e-paper, a TV, or a monitor.

The foldable display device may include a display panel, a backplate and a cover window. The backplate is disposed under the display panel to support the display panel, and the cover window is disposed over the display panel to protect the display panel.

On the other hand, because the foldable display device should be folded and unfolded, all of the display panel, the backplate, and the cover window should be of a very thin film type. However, an external impact is transmitted in a vertical direction in the thin film type elements. Namely, an impact, which is applied to the cover window or the backplate, is directly transmitted into the display panel. As a result, the display panel may be damaged, and the display quality of the foldable display device is decreased.

SUMMARY

Accordingly, the present invention is directed to a foldable device that substantially obviates one or more of the problems due to limitations and disadvantages of the related art.

An object of the present invention is to provide a foldable display device having improved impact resistance.

Another object of the present invention is to provide a foldable display device that can be easily manufactured.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a foldable display device comprises a display panel including a first surface and a second surface opposite to the first surface; and an impact absorption film adjacent to the second surface of the display panel and including first and second impact absorption layers; wherein the second impact absorption layer includes a soft part corresponding to a first region of the second impact absorption layer and a hard part corresponding to a second region of the second impact absorption layer, and wherein the first impact absorption layer and the soft part of the second impact absorption layer have an elastic modulus value less than an elastic modulus value of the hard part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the present invention, examples of which are illustrated in the accompanying drawings.

Figure 1:
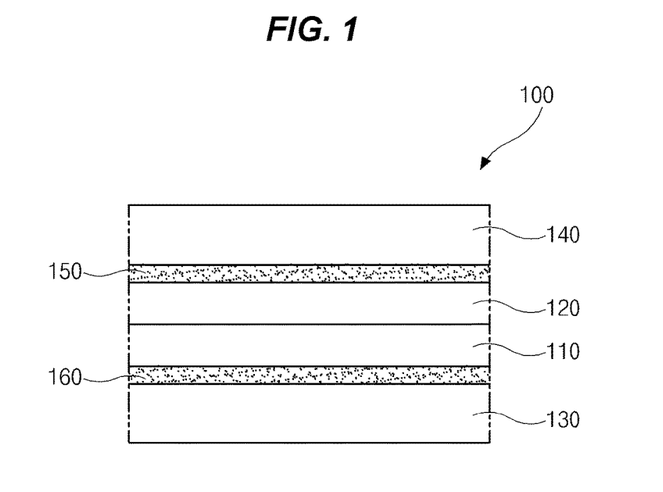
FIG. 1 is a cross-sectional view of a foldable display device according to a first example embodiment of the present invention.
Figure 2:
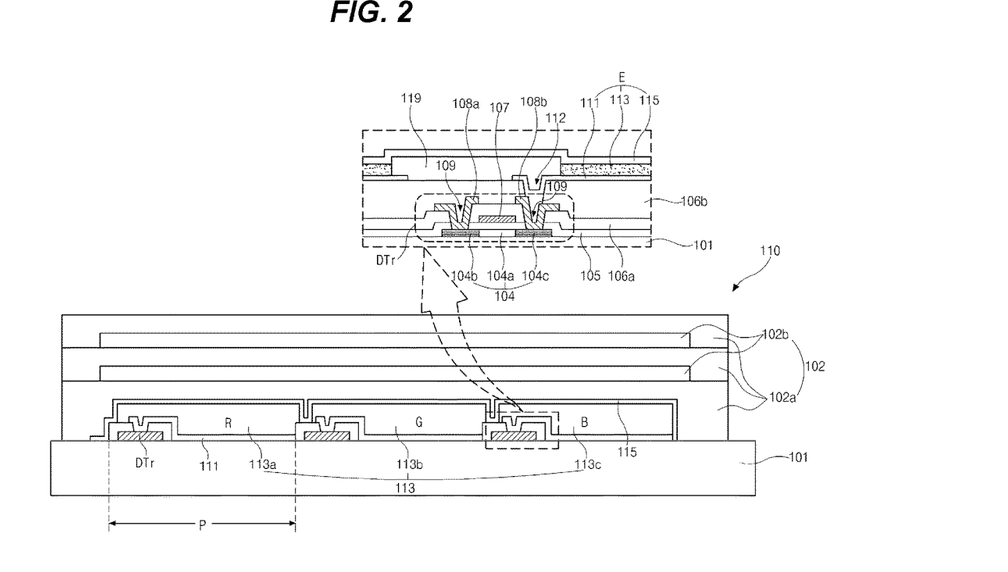
FIG. 2 is a cross-sectional view of an example display panel for a foldable display device according to the present invention.

FIG. 1 is a cross-sectional view of a foldable display device according to a first example embodiment of the present invention, and FIG. 2 is a cross-sectional view of an example display panel for a foldable display device according to the present invention.

As shown in FIG. 1, a foldable display device 100 includes a display panel 110 for providing an image, a backplate 130 supporting the display panel 110 and a cover window 140 protecting the display panel 110. The backplate 130 is disposed at one side of the display panel 110, and the cover window 140 is disposed at an opposite side of the display panel 110. Namely, the display panel 110 is positioned between the backplate 130 and the cover window 140.

The foldable display device 100 may further include a touch panel 120 including a touch sensor (not shown). The touch panel 120 may be disposed between the display panel 110 and the cover window 140. For example, the display panel 110 may be one of a liquid crystal display (LCD) device, a plasma display panel (PDP) device, a field emission display (FED) device, an organic light emitting display (OLED) device. For example, the display panel 110 may be an OLED device because the OLED device has excellent characteristics, such as a thin profile, light weight, and low power consumption.

As will be further described later, the cover window 140 may be attached to the touch panel 120 using a first optical adhesive layer 150. Similarly, the backplate 130 may be attached to a rear side of the display panel 110 using a second optical adhesive layer 160.

As shown in FIG. 2, the display panel 110 for the OLED device may include a substrate 101, a driving thin film transistor (TFT) DTr, an organic emitting diode E, and a protection film 102. The driving TFT DTr and the organic emitting diode E may be formed on the substrate 101 and may be encapsulated by the protection film 102. A plurality of pixel regions P are defined on the substrate 101, and the driving TFT DTr and the organic emitting diode E are positioned in each pixel region P.

A semiconductor layer 104 is formed on the substrate 101 and in the pixel region P. The semiconductor layer 104 may be formed of silicon and includes an active area 104a, a source area 104b and a drain area 104c. The active area 104a, as a channel, is at a center of the semiconductor layer 104, and the source and drain areas 104b and 104c are positioned at both sides of the active area 104a, respectively. High impurities are doped into the source and drain areas 104b and 104c.

A gate insulating layer 105 is formed on the semiconductor layer 104, and a gate electrode 107 is formed on the gate insulating layer 105. The gate electrode 107 corresponds to the active area 104a of the semiconductor layer 104. In addition, a gate line (not shown), which extends along a first direction, is formed on the gate insulating layer 105.

A first interlayer insulating layer 106a is formed on the gate electrode 107 over an entire surface of the substrate 101. First and second semiconductor contact holes 109, which respectively expose the source and drain areas 104b and 104c, are formed through the first interlayer insulating layer 106a and the gate insulating layer 105.

A source electrode 108a and a drain electrode 108b, which are spaced apart from each other, are formed on the first interlayer insulating layer 106a. The source and drain electrodes 108a and 108b contact the source and drain areas 104b and 104c through the first and second semiconductor contact holes 109, respectively. In addition, a data line (not shown) and a power line (not shown), which extend along a second direction, are formed on the first interlayer insulating layer 106a.

The semiconductor layer 104, the gate electrode 107, the source electrode 108a and the drain electrode 108b constitute the driving TFT DTr. Although not shown, a switching TFT, which has substantially the same structure as the driving TFT DTr, is formed. The switching TFT is electrically connected to the gate line, the data line and the driving TFT DTr.

In FIG. 2, the gate electrode 107, the source electrode 108a and the drain electrode 108b are positioned over the semiconductor layer 104, and the semiconductor layer 104 includes an oxide semiconductor material or poly-silicon. Namely, the TFT Tr has a coplanar structure. Alternatively, the gate electrode may be positioned under the semiconductor layer, and the source and drain electrodes may be positioned over the semiconductor layer such that the TFT Tr may have an inverted staggered structure. In this instance, the semiconductor layer may include amorphous silicon.

A second interlayer insulating layer 106b, which includes a drain contact hole 112 exposing the drain electrode 108b, is formed on the source and drain electrodes 108a and 108b. A first electrode 111 is formed on the second interlayer insulating layer 106b in an image-displaying region. For example, the first electrode 111 may have a relatively high work function to serve an anode. The first electrode 111 may include a transparent conductive material, such as indium-tin-oxide (ITO) or indium-zinc-oxide (IZO). The first electrode 111 is connected to the drain electrode 108b of the driving TFT DTr through the drain contact hole 112 and is separated in each pixel region P.

A bank 119 is formed over the first interlayer insulating layer 106b at a boundary of the pixel region P. The bank 119 covers an edge of the first electrode 111 and exposes a center of the first electrode 111.

An organic emitting layer 113 is formed on the first electrode 111. The organic emitting layer 113 may have a single-layered structure of an emitting material. Alternatively, to increase an emitting efficiency, the organic emitting layer 113 may have a multi-layered structure of a hole injection layer, a hole transporting layer, an emitting material layer, an electron transporting layer and an electron injection layer. The organic emitting layer 113 may include red, green, and blue emitting patterns 113a, 113b and 113c in each pixel region P.

A second electrode 115 may be formed on the organic emitting layer 113 over an entire surface of the substrate 101. The second electrode 115 may have a relatively low work function to serve a cathode. For example, the second electrode 115 may be a semi-transparent thin metal film of aluminum (Al), magnesium (Mg), or Al—Mg alloy. Alternatively, the second electrode 115 may have a double-layered structure of a transparent conductive material layer on a semi-transparent tin metal film. The light from the organic emitting layer 113 passes through the second electrode 115 such that the organic emitting diode E, which includes the first and second electrodes 111 and 115 and the organic emitting layer 115 therebetween, is operated in a top emission type. In this instance, a reflection electrode or a reflection layer may be formed under the first electrode 111. Alternatively, with the second electrode 115 formed of an opaque metal layer, the light from the organic emitting layer 113 may pass through the first electrode 111 such that the organic emitting diode E may be operated in a bottom emission type.

In the OLED panel 110, when the voltages are applied to the first and second electrodes 111 and 115, holes from the first electrode 111 and electrons from the second electrode 115 are transported into the organic emitting layer 113 to form an exciton. The exciton is transited from an excitation state into a ground state to emit the light. As a result, the OLED panel 110 can display an image at a side of the first electrode 111 or the second electrode 115.

The protection film 102, as a thin film, is formed over the driving TFT DTr and the organic emitting diode E such that the organic emitting diode E is encapsulated by the protection film 102. The moisture penetration into the organic emitting diode E and/or the driving TFT DTr is prevented by the protection film 102. For example, the protection film 102 may include at least first and second inorganic layers 102a with an organic layer 102b therebetween.

To provide a flexible property, the substrate 101 may include polyimide. The polyimide substrate is not adequate for fabrication processes of elements such as the driving TFT DTr. Accordingly, with a carrier substrate (not shown) attached to a lower surface of the polyimide substrate 101, elements such as the driving TFT DTr are formed on the polyimide substrate 101, and the carrier substrate is released from the polyimide substrate 101.

As illustrated in FIG. 1, the touch panel 120 may be disposed on or over the display panel 110. For example, the display panel 110 and the touch panel 120 are attached using an adhesive layer (not shown).

Although not shown, the touch panel 120 may include a first touch film including a first touch electrode and a second touch film including a second touch electrode. The first and second touch films are spaced apart from and face each other. The first and second touch electrodes may constitute a touch sensor.

For example, the first touch electrode may be formed on an entire surface of the first touch film. The first touch electrode may include a transparent conductive material, such as ITO or IZO. The second touch electrode may have a bar shape along a direction and spaced apart from the first touch electrode by a pre-determined distance. The second touch electrode may include a metallic material, such as Al, Al alloy (AlNd), Mg, gold (Au), or silver (Ag). The first and second touch electrodes constitute a touch sensor. With a touch at a position of the touch panel 120 by a touch object, the first and second touch electrodes at the touch position are electrically connected such that the touch position can be detected.

In FIG. 1, the touch panel 120 and the display panel 110 are modularized by the cover window 140 and the backplate 130. The touch panel 120 is positioned at an image-display side of the display panel 110, and the cover window 140 is attached to the touch panel 120 using a first optical adhesive layer 150. If the touch panel 120 is not used, the cover window 140 is attached to the image-display side of the display panel 110 using the first optical adhesive layer 150. The backplate 130 is attached to a rear side of the display panel 110 using a second optical adhesive layer 160, i.e., to an opposite side of the display panel 110 opposite to the image-display side.

For example, each of the first and second optical adhesive layers 150 and 160 is formed of an optical clear adhesive material and has a thickness of about 100 to 300 micrometers. When the thickness of each of the first and second optical adhesive layers 150 and 160 is smaller than 100 micrometers, an adhesive strength is insufficient such that there is a problem in the modularization of the foldable display device 100. On the other hand, when the thickness of each of the first and second optical adhesive layers 150 and 160 is larger than 300 micrometers, there is a problem in a folding operation of the foldable display device 100.

The display panel 110 (and the touch panel 120) can be protected from the outer impact by the cover window 140, and the image from the display panel 110 is displayed on the cover window 140. The impact withstand (or impact resistance) property and the transmittance property are required in the cover window 140. For example, the cover window 140 may be formed of one of polymethylmethacrylate (PMMA), polycarbonate (PC), cyclo-olefin polymer (COP), polyethylene terephthalate (PET), polyimide (PI), and polyaramid (PA).

The substrate 101, which has a relatively small thickness, of the display panel 110 is supported by the backplate 130. For example, the backplate 130 may be formed of a metallic material, e.g., stainless steel (SUS) or a polymer, e.g., PMMA, PC, polyvinylalcohol (PVA), acrylonitrile-butadiene-styrene (ABS), or PET.

Each of the first and second optical adhesive layers 150 and 160 has a modulus value, i.e. a Youngs modulus value or value of an elastic modulus, smaller than each of the cover window 140, the touch panel 120, the display panel 110 and the backplate 130. In more detail, the modulus value of the first optical adhesive layer 150 is smaller than that of the cover window 150 and the display panel 110 (and/or the touch panel 120), and the modulus of the second optical adhesive layer 160 is smaller than that of the display panel 110 and the backplate 130. Namely, each of the first and second optical adhesive layers 150 and 160 has a stiffness smaller than each of the cover window 140, the touch panel 120, the display panel 110 and the backplate 130.

For example, each of the cover window 140, the touch panel 120 and the display panel 110 has the modulus value of about 5 to 8 GPa, and the backplate 130 has the modulus value of about 8 to 10 GPa. Each of the first and second optical adhesive layers 150 and 160 has the modulus value of about $10^3$ to $10^4$ Pa. In other words, in the foldable display device 100, a high modulus element and a low modulus element are alternately arranged in a vertical direction.

Particularly, the modulus value of the first optical adhesive layer 150 between the cover window 140 and the touch panel 120 is smaller than that of each of the cover window 140 and the touch panel 120, and the modulus value of the second optical adhesive layer 160 between the display panel 110 and the backplate 130 is smaller than that of each of the display panel 110 and the backplate 130. As a result, the outer impact applied to the cover window 140 and/or the backplate 130 and transmitted into the display panel 110 and/or the touch panel 120 is minimized such that damage to the display panel 110 and/or the touch panel 120 is minimized or prevented.

The thin films in the foldable display device transmit the outer impact in a vertical direction instead of a horizontal direction (i.e., absorption of the outer impact). For example, when the outer impact is applied to the cover window 140, the outer impact is directly (i.e., vertically) transmitted into the touch panel 120 and/or the display panel 110. As a result, the damages on the electrodes or the elements in the touch panel 120 and/or the display panel 110 are generated.

However, in the foldable display device 100, because a high modulus element, e.g., the cover window 140, the touch panel 120, the display panel 110 and the backplate 130, and a low modulus element, e.g., the first and second optical adhesive layers 150 and 160, are alternately stacked in a vertical direction, the outer impact is relaxed or relieved when passing the high and low modulus elements. Accordingly, the outer impact transmitted into the touch panel 120 and/or the display panel 110 is minimized or prevented.

Particularly, when a modulus value difference between the high modulus element, e.g., the cover window 140, the touch panel 120, the display panel 110 and the backplate 130, and the low modulus element, e.g., the first and second optical adhesive layers 150 and 160, is greater, the damage to the touch panel 120 and/or the display panel 110 by the outer impact is minimized.

TABLE 1

| | Modulus value of optical adhesive layer (150 and 160) | |
|---|---|---|
| Sample A | $2.2 \times 10^5$ Pa | <5 cm |
| Sample B | $1.3 \times 10^3$ Pa | <10 cm |

The ball-drop test results to the foldable display device in the folding region regarding the modulus value of the optical adhesive layers and the impact absorption film are listed in Table 1.

In the ball-drop test, after an upper set and a lower set are combined to the foldable display device, a ball with various heights is dropped onto the foldable display device to detect whether there is a damage or not. When the drop-height of the ball to cause damage on the foldable display device is higher, the durability of the display device is deemed higher. In this instance, the lower set includes a folding region "FR" (e.g., of FIG. 3) and a non-folding region "NFR" (e.g., of FIG. 3), and the lower set contacts the foldable display device in the folding region "FR" and is spaced apart from the foldable display device in the non-folding region "NFR" to form a gap. For example, the gap between the lower set and the foldable display device in the non-folding region "NFR" may be about 1 mm.

"Sample A" is the ball-drop test results to the foldable display device with optical adhesive layers having a modulus value of $2.2 \times 10^5$ Pa, and "Sample B" is the ball-drop test results to the foldable display device with optical adhesive layers having a modulus value of $1.3 \times 10^3$ Pa.

In the "Sample A" and "Sample B", each of the cover window 140, the touch panel 120 and the display panel 110 has a modulus value of about 5 to about 8 GPa, and the backplate 130 has a modulus value of about 8 to about 10 GPa.

As listed in Table 1, as the modulus value of the optical adhesive layers 150 and 160 is smaller ("Sample B"), the ball-drop test is improved. (<10 cm) Namely, as mentioned above, when the optical adhesive layers having a relatively small modulus value with respect to the high modulus element, the damage by the outer impact is further reduced.

Figure 3:
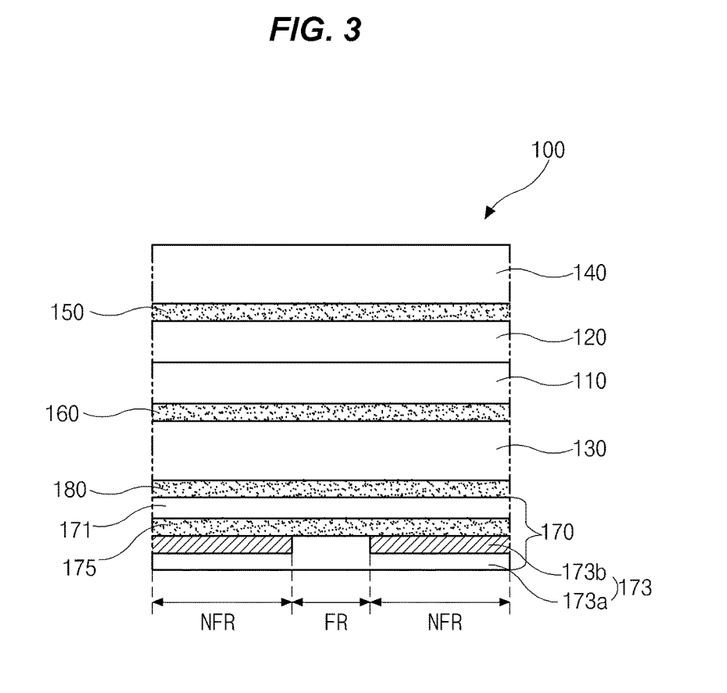
FIG. 3 is a cross-sectional view of a foldable display device according to a second example embodiment of the present invention.

FIG. 3 is a cross-sectional view of a foldable display device according to a second example embodiment of the present invention. The same reference numbers are used for the same elements, and the explanations are focused on differences from the first example embodiment.

As shown in FIG. 3, a foldable display device 100 includes a display panel 110, a backplate 130 supporting the display panel 110, a cover window 140 protecting the display panel 110 and an impact absorption film 170 and, optionally a touch panel 120 including a touch sensor (not shown). That is, the foldable display device 100 according to the second example embodiment may correspond to the foldable display device 100 according to the first example embodiment, in which an impact absorption film 170 is added.

The impact absorption film 170 is disposed at a rear side of the backplate 130, i.e. at an opposite side of the backplate 130 opposite to a side of the backplate 130, at which the display panel 110 is disposed. The impact absorption film 170 is attached to the backplate 130 using a third optical adhesive layer 180. The third optical adhesive layer 180 has a modulus value smaller than each of the cover window 130, the touch panel 120, the display panel 110 and the backplate 130.

For example, each of the cover window 140, the touch panel 120 and the display panel 110 has the modulus value of about 5 to 8 GPa, and the backplate 130 has the modulus value of about 8 to 10 GPa. The third optical adhesive layer 180 has the modulus value of about $10^3$ to $10^4$ Pa. That is, the first to third optical adhesive layers 150, 160, and 180 may have the same modulus value.

The third optical adhesive layer 180, which has a relatively low modulus value, is disposed under the backplate 130, which has a relatively high modulus value, such that the impact transmitted into the display panel 110 and/or the touch panel 120 is minimized or prevented. The third optical adhesive layer 180 is formed of an optical cleared adhesive material and has a thickness of about 100 to 300 micrometers.

The impact absorption film 170 includes first and second impact absorption layers 171 and 173, i.e., the impact absorption film 170 may be formed of a double layer including the first and second impact absorption layers 171 and 173. The first impact absorption layer 171 may be formed of a foam-type material. The second impact absorption layer 173 may include a soft part 173a corresponding to a folding region "FR" and a hard part 173b corresponding to a non-folding region "NFR". The soft part 173a may be inserted into a space between two portions of the hard part 173b. Namely, when the non-folding region "NFR" includes a first and a second non-folding region at both sides of the folding region "FR", the soft part 173a corresponds to the folding region "FR" and is inserted into a space between a first hard part 173b corresponding to the first non-folding region and a second hard part 173b corresponding to the second non-folding region. The soft part 173a is positioned to correspond to only the folding region FR. However, in the non-folding region "NFR", the soft part 173a may be positioned to cover the hard part 173b. Alternatively, the second impact absorption layer 173 may have a double-layered structure, wherein the soft part 173a includes a base portion corresponding to both the folding region "FR" and the non-folding region "NFR" and a protrusion portion corresponding to the folding region "FR". The protrusion may be inserted into the space between the first and second portions of the hard part 173b in the first and second non-folding regions.

On the other hand, a boundary between the soft part 173a and the hard part 173b may be observed by the viewer because the refractive index of the materials of the soft part 173a and the hard part 173b is different. As a result, the image quality of the foldable display device 110 may be degraded. To prevent this problem, a boundary between the soft part 173a and the hard part 173b corresponds to a boundary of adjacent pixel regions in the display panel 110. For example, the boundary between the soft part 173a and the hard part 173b may correspond to the bank 119 (e.g., of FIG. 2).

The soft part 173a may be formed of one of polyurethane (PU), thermoplastic polyurethane (TPU), silicon (Si) and polydimethylacrylamide (PDMA). The hard part 173b may be formed of a metallic material, e.g., SUS, or polymer, e.g., PMMA, PC, PVA, ABS or PET.

Each of the first impact absorption layer 171 and the soft part 173a of the second impact absorption layer 173 has a modulus value being smaller than the cover window 140, the touch panel 120, the display panel 110 and the backplate 130, and the hard part 173b of the second impact absorption layer 173 has a modulus value being substantially equal to the cover window 140, the touch panel 120, the display panel 110, and the backplate 130.

For example, each of the cover window 140, the touch panel 120, the display panel 110 and the hard part 173b of the second impact absorption layer 173 has the modulus value of about 5 to 8 GPa, and the backplate 130 has the modulus value of about 8 to 10 GPa. Each of the first impact absorption layer 171 and the soft part 173a of the second impact absorption layer 173 has the modulus value of about $10^3$ to $10^4$ Pa.

Accordingly, in the impact absorption film 170, because a high modulus element, i.e., the hard part 173b, and a low modulus element, i.e., the soft part 173a and the first impact absorption layer 171, are mixed, the impact is securely relaxed or relieved. When the impact absorption film 170 includes a low modulus part without a high modulus part, the deformation of the impact absorption film is easily generated. On the other hand, when the impact absorption film includes a high modulus part without a low modulus part, the outer impact is directly transmitted into the display panel 110 and/or the touch panel 120.

The first and second impact absorption layers 171 and 173 may be attached to each other using a fourth optical adhesive layer 175. The fourth optical adhesive layer 175 is formed of an optical cleared adhesive material and has a thickness of about 100 to 300 micrometers. Because the fourth optical adhesive layer 175 is an element of the impact absorption film 170, the modulus value of the fourth optical adhesive layer 175 is not limited.

Because the first impact absorption layer 171 and the third optical adhesive layer 180, (which are sequentially stacked over the fourth optical adhesive layer 175) have modulus values less than that of the backplate 130, the stacked layers of the fourth optical adhesive layer 175, the first impact absorption layer 171 and the third optical adhesive layer 180 in the non-folding region "NFR" serve as a low modulus element.

The first impact absorption layer 171 has a thickness of about 100 to 300 micrometers. When the thickness of the first impact absorption layer 171 is smaller than 100 micrometers, the impaction absorption is insufficient. On the other hand, when the thickness of the first impact absorption layer 171 is larger than 300 micrometers, there is a problem in the folding operation of the foldable display device 100.

The second impact absorption layer 173 may have a total thickness of about 0.1 to 1 mm (millimeter), and the soft part 173a has a thickness of about 0 to 0.9 mm in the non-folding region "NFR". When the thickness of the second impact absorption layer 173 is smaller than 0.1 mm, the impaction absorption is insufficient. On the other hand, when the thickness of the second impact absorption layer 173 is larger than 1 mm, there is a problem in the folding operation of the foldable display device 100.

In addition, when the thickness of the hard part 173b is smaller than 0.1 millimeter, the effect of the hard part 173b is insufficient and the hard part 173b having the thickness below 0.1 millimeter is insecurely fabricated. On the other hand, when thickness of the hard part 173b is larger than 1 millimeter, there is a problem in the folding operation of the foldable display device 100.

In the foldable display device 100 according to the second example embodiment of the present invention, because a high modulus element, e.g., the cover window 140, the touch panel 120, the display panel 110 and the backplate 130, and a low modulus element, e.g., the first and second optical adhesive layers 150 and 160, are alternately stacked in a vertical direction, the outer impact is relaxed or relieved when passing the high and low modulus elements. In addition, due to the impact absorption film 170 under the backplate 130, the damage to the display panel 110 and/or the touch panel 120 is further reduced.

TABLE 2

| Modulus value of backplate (130) | Sample A | Thickness of first impact absorption layer (1 t = 0.1 cm) | Sample C | Sample D |
|---|---|---|---|---|
| 0~1 GPa | <5 cm | 0.05 t | <5 cm | <10 cm |
|  |  | 0.10 t | <5 cm | <10 cm |
|  |  | 0.30 t | <5 cm | <10 cm |
| 4~7 GPa | <5 cm | 0.05 t | <5 cm | <10 cm |
|  |  | 0.10 t | <10 cm | <10 cm |
|  |  | 0.30 t | <10 cm | <10 cm |
| 8~10 GPa | <5 cm | 0.05 t | <5 cm | <15 cm |
|  |  | 0.10 t | <10 cm | <15~20 cm |
|  |  | 0.30 t | <10 cm | <15~20 cm |

The ball-drop test results of the foldable display device in the folding region regarding the modulus value of the backplate and the impact absorption film are listed in Table 2.

"Sample A" corresponds to the ball-drop test results to the foldable display device with the optical adhesive layers having a modulus value of $2.2 \times 10^5$ Pa and without the impact absorption film. The impact withstand property is tested by the ball-drop test with the first impact absorption layer having various thickness. "Sample C" corresponds to the ball-drop test results to the foldable display device with the first impact absorption layer 171 without the second impact absorption layer 173. In the "Sample C", the optical adhesive layers 150, 160, and 180 having a modulus value of $1.3 \times 10^3$ Pa are used. "Sample D" corresponds to the ball-drop test results of the foldable display device with the impact absorption film 170 including the first and second impact absorption layers 171 and 173. Namely, in the foldable display device of "Sample D", the second impact absorption layer 173 is further included into the foldable display device of "Sample C". In addition, in the "Sample D", the soft part 173a has a thickness of 300 micrometers in the non-folding region, and the hard part 173b has a thickness 300 micrometers.

As listed in Table 2, when the modulus value of the backplate 130 is small (e.g., 0~1 GPa), the ball drop tests are substantially maintained in the "Sample A" and "Sample C". Namely, although the condition of the modulus value of the optical adhesive layers 150 and 160, the existence of the first impact absorption layer 171, and a thickness of the first impact absorption layer 171 are different in "Sample A" and "Sample C", the ball drop tests are maintained. In one example, the backplate 130 may have a modulus value being larger than about 4 GPa.

In addition, with the backplate having the modulus value above 10 GPa, there is a problem in the folding operation of the foldable display device. Accordingly, the backplate 130 may have a modulus value of about 4 to about 10 GPa.

In the "Sample C" including the first impact absorption layer 171 of 0.05 t with the backplate 130 having the modulus value of 4 to 7 GPa, the damage on the touch panel 120 and/or the display panel 110 is generated with the ball-drop test at a height of 5 cm. However, the "Sample C" including the first impact absorption layer 171 of 0.10~0.30 t with the backplate 130 having the modulus value of 4 to 7 GPa, the damage on the touch panel 120 and/or the display panel 110 is generated with the ball-drop test at a height above 10 cm. Namely, the first impact absorption layer 171 may have a thickness of about 100 to 300 micrometers.

In "Sample A", with the ball-drop test at a height of 5 cm, the damage on the touch panel 120 and/or the display panel 110 is generated regardless of the modulus value of the backplate 130.

On the other hand, the impact withstand (impact resistance) property of "Sample D" is remarkably improved in comparison to "Sample A". Namely, the outer impact is relaxed or relieved in the foldable display device 100 with the impact absorption film 170 including both the first and second impact absorption layers 171 and 173 and the first to third optical adhesive layers 150, 160, and 180 having about $10^3$ Pa modulus value such that the damages on the display panel 110 and/or the touch panel 120 by the outer impact is minimized or prevented.

As mentioned above, in the foldable display device 100 according to the second example embodiment of the present invention, because a high modulus element and a low modulus element are alternately stacked in a vertical direction, the outer impact is relaxed or relieved when passing the high and low modulus elements. In addition, due to the impact absorption film 170 under the backplate 130, the damages on the display panel 110 and/or the touch panel 120 is further reduced.

Figure 4:
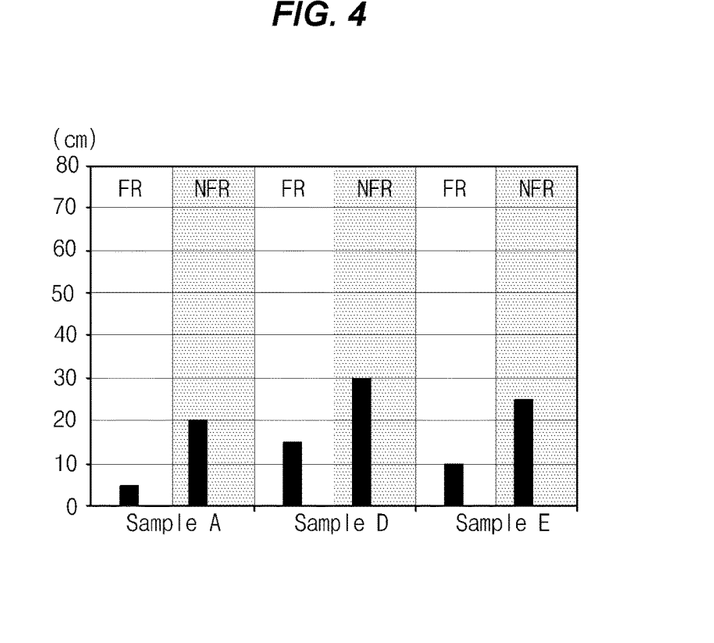
FIG. 4 is a graph illustrating a ball-drop test of an example foldable display device according to the present invention.

FIG. 4 is a graph illustrating a ball-drop test of an example foldable display device according to the present invention.

In the graph of FIG. 4, the vertical axis is a height of the ball. The "Sample A" is a foldable display device with the optical adhesive layers having $2.2 \times 10^5$ Pa modulus value and without the impact absorption layer.

The "Sample D" is a foldable display device according to the second example embodiment of the present invention. For example, the foldable display device in "Sample D" includes first and second impact absorption layers 171 and 173, and each of the first to third optical adhesive layers 150, 160, and 180 has a modulus value of $1.3 \times 10^3$ Pa. In the second impact absorption layer 173, the soft part 173a in the non-folding region and the hard part 173b have a thickness of 300 micrometers, respectively.

The "Sample E" is a foldable display device with the second impact absorption layer 173 without the first impact absorption layer 171. Each of the first to third optical adhesive layers 150, 160, and 180 has a modulus value of $1.3 \times 10^3$ Pa, and the soft part 173a in the non-folding region and the hard part 173b have a thickness of 300 micrometers, respectively. Here, the foldable display device of "Sample E" has the same structure except the first impact absorption layer.

The folding region "FR" is a folded region to have a curvature in the folding operation, and the non-folding region "NFR" is a region having a substantially flat state in the folding operation. The non-folding region "NFR" is positioned at both sides of the folding region "FR". The bar graph is a minimum height of ball generating the damages on the foldable display device.

As shown in FIG. 4, in the folding region "FR", there are damages on the foldable display device at the ball height of 5 centimeters (Sample A), while there are damages on the foldable display device at the ball height of 15 centimeters (Sample D). In the non-folding region "NFR", there are damages on the foldable display device at the ball height of 20 centimeters (Sample A), while there are damages on the foldable display device at the ball height of 30 centimeters (Sample D).

Because a high modulus element and a low modulus element are alternately stacked in a vertical direction and the impact absorption film including the first and second impact absorption layers are formed at a rear side of the backplate in the foldable display device of the present invention, the foldable display device of the present invention has an improved impact withstand property in comparison to the related art foldable display device. Accordingly, the damage to the foldable display device 100 by the impact is minimized or prevented.

In addition, as shown from the ball-drop test in the "Sample D" and "Sample E", the damage is easily generated on the foldable display device without the first impact absorption layer.

As shown from the ball-drop test in the "Sample C" and "Sample D" of Table 2, the damage is decreased in the foldable display device including the first and second impact absorption layers in comparison to the foldable display device including the first impact absorption layer without the second impact absorption layer. In addition, as shown from the ball-drop test in the "Sample D" and "Sample E" of FIG. 4, the damage is decreased in the foldable display device including the first and second impact absorption layers in comparison to the foldable display device including the second impact absorption layer without the first impact absorption layer.

In addition, when the backplate 130 has a relatively low modulus value, the damage through the backplate 130 is prevented by the impact absorption film 170 such that the production cost of the backplate 130 is reduced.

TABLE 3

| Modulus value of optical adhesive layer (150 and 160) | Sample F | Sample D |
| --- | --- | --- |
| $2.2 \times 10^5$ Pa | <5 cm | <5 cm |
| $1.3 \times 10^3$ Pa | <10 cm | FR < 15 cm |
| | | NFR < 30 cm |

The ball-drop test results of the foldable display device regarding the modulus value of the optical adhesive layers and the existence of the impact absorption film are listed in Table 3 above.

"Sample F" is the ball-drop test results to the foldable display device without the impact absorption film, and "Sample D" is the ball-drop test results to the foldable display device with the impact absorption film 170 including the first and second impact absorption layers 171 and 173. In "Sample D", the first impact absorption layer has a thickness of 200 micrometers, and each of the soft part 173a in the non-folding region and the hard part 173b has a thickness of 300 micrometers. Here, the second impact absorption layer has a total thickness of 600 micrometers. In the foldable display device, each of the cover window 140, the touch panel 120, the display panel 110 has a modulus value of 5 to 8 GPa, and the backplate 130 has a modulus value of 8 to 10 GPa.

As listed in Table 3, each of the first optical adhesive layer 150 between the cover window 140 and the touch panel 120 and the second optical adhesive layer 160 between the display panel 110 and the backplate 130 has a relatively low modulus value, i.e., $1.3 \times 10^3$ Pa, the impact withstand property is improved in both the foldable display devices without the impact absorption film ("Sample F") and with the impact absorption film ("Sample D").

In more detail, in "Sample F", the damage on the touch panel 120 and/or the display panel 110 is generated in the ball-drop test at a height of 5 cm with the optical adhesive layer having a high modulus value, i.e., about $2.2 \times 10^5$, while the damage on the touch panel 120 and/or the display panel 110 is generated in the ball-drop test at a height of 10 cm with the optical adhesive layer having a high modulus value, i.e., about $1.3 \times 10^3$.

The damage on the display panel 110 and/or the touch panel 120 depends on the modulus value of the optical adhesive layers 150 and 160. The damage on the display panel 110 and/or the touch panel 120 is minimized in the foldable display device with the optical adhesive layers 150 and 160 each having a relatively low modulus value, e.g., $1.3 \times 10^3$, in comparison to the foldable display device with the optical adhesive layers 150 and 160 each having a relatively low modulus value, e.g., $2.2 \times 10^5$.

In addition, in "Sample D" with low modulus optical adhesive layers and the impact absorption film 170 including the first and second impact absorption layers 171 and 173, the impact withstand property of the foldable display device is further increased.

In the foldable display device 100 according to the second example embodiment of the present invention, because a high modulus element and a low modulus element are alternately stacked in a vertical direction, the outer impact is relaxed or relieved when passing the high and low modulus elements. In addition, due to the impact absorption film 170 under the backplate 130, the damages on the display panel 110 and/or the touch panel 120 is further reduced.

In FIGS. 1 and 3, the foldable display device 100 includes the touch panel 120 at a side of the display panel 110. However, the touch panel 120 can be omitted. In this instance, the first optical adhesive layer 150 contacts the display panel 110 without the touch panel 120.

In accordance with example embodiments, a foldable display device may comprise a display panel; a cover window at a first side of the display panel; an impact absorption film at a second side of the display panel and including first and second impact absorption layers; and a backplate between the display panel and the impact absorption film and including a folding region and an non-folding region, wherein the second impact absorption layer includes a soft part corresponding to the folding region and a hard part corresponding to the non-folding region, and each of the first impact absorption layer and the soft part has a modulus value being smaller than the hard part.

The first impact absorption layer may include a foam-type material, and the soft part includes one of polyurethane (PU), thermoplastic polyurethane (TPU), silicon (Si), and polydimethylacrylamide (PDMA), and wherein the hard part includes one of stainless steel (SUS), PMMA, polycarbonate (PC), polyvinylalcohol (PVA), acrylonitrile-butadiene-styrene (ABS) and polyethylene terephthalate (PET). The first impact absorption layer may have a thickness of about 100 to 300 micrometers. The second impact absorption layer may have a thickness of about 0.1 to 1 millimeter. The soft part may have a thickness of about 0 to 0.9 millimeter in the non-folding region. The hard part may have a thickness of about 0.1 to 1 millimeter. The modulus value of the first impact absorption layer may have a range of about $10^3$ to $10^4$ Pa. The modulus value of the soft part may have a range of about $10^3$ to $10^4$ Pa, and the modulus value of the hard part has a range of about 5 to 8 GPa.

The display device may further comprise a first optical adhesive layer between the cover window and the display panel and having a modulus value being smaller than the cover window and the display panel; and a second optical adhesive layer between the display panel and the backplate and having a modulus value being smaller than the display panel and the backplate. The modulus value of each of the first and second optical adhesive layers may have a range of about $10^3$ to $10^4$ Pa. The display device may further comprise a third optical adhesive layer between the impact absorption film and the backplate and having a modulus value being smaller than the backplate. The modulus value of the third optical adhesive layer may have a range of about $10^3$ to $10^4$ Pa.

The display device may further comprise a touch panel between the display panel and the cover window; and an optical adhesive layer between the touch panel and the cover window. A modulus value of the optical adhesive layer may be smaller than the touch panel and the cover window. The modulus value of the optical adhesive layer may have a range of about $10^3$ to $10^4$ Pa. The first and second impact absorption layers may be attached to each other by an optical adhesive layer.

The non-folding region may include first and second non-folding regions at both sides of the folding region. The hard part may include first and second parts respectively in the first and second non-folding regions. A portion of the soft part corresponding to the folding region may be inserted into a space between the first and second parts of the hard part. The display panel may include a plurality of pixel regions. A boundary of the folding region and the non-folding region may correspond to a boundary of adjacent pixel regions.

In accordance with another example embodiment, a foldable display panel may comprise a display panel; a cover window at a side of the display panel; a first optical adhesive layer between the display panel and the cover window; a backplate at a second side of the display panel; and a second optical adhesive layer between the display panel and the backplate, wherein the first optical adhesive layer has a modulus value being smaller than the display panel and the cover window, and the second optical adhesive layer has a modulus value being smaller than the display panel and the cover window. The folding display device may further comprise an impact absorption layer under the backplate; and a third optical adhesive layer between the impact absorption layer and the backplate, wherein the impact absorption layer has a modulus value being smaller than the backplate.

It will be apparent to those skilled in the art that various modifications and variations can be made in the foldable display device of the present invention without departing from the spirit or scope of the invention. Thus, it is intended that the present invention cover the modifications and variations of this invention provided they come within the scope of the appended claims and their equivalents.

What is claimed is:

1. A foldable display device, comprising:
   a display panel including a first surface and a second surface opposite to the first surface; and
   an impact absorption film adjacent to the second surface of the display panel and including first and second impact absorption layers;
   wherein the second impact absorption layer includes a soft part corresponding to a first region of the second impact absorption layer and a hard part corresponding to a second region of the second impact absorption layer,
   wherein the soft part of the second impact absorption layer is formed of a different material than the hard part of the second impact absorption layer, and
   wherein the first impact absorption layer and the soft part of the second impact absorption layer have an elastic modulus value less than an elastic modulus value of the hard part.

2. The foldable display device according to claim 1, wherein the first region is inserted between two portions of the second region, and wherein the first region corresponds to a folding region and the second region corresponds to a non-folding region.

3. The foldable display device according to claim 1, wherein the first impact absorption layer includes a foam material.

4. The foldable display device according to claim 1, wherein the first impact absorption layer is between the second impact absorption layer and the display panel.

5. The foldable display device according to claim 1, wherein the first impact absorption layer has a thickness in a range of 100 to 300 micrometers.

6. The foldable display device according to claim 1, wherein at least one of the first impact absorption layer and the soft part has an elastic modulus in a range of $10^3$ to $10^4$ Pa.

7. The foldable display device according to claim 1, wherein the hard part of the second impact absorption layer has a thickness in a range of 100 to 1000 micrometers.

8. The foldable display device according to claim 1, wherein the hard part of the second impact absorption layer has a thickness in a range of 100 to 500 micrometers.

9. The foldable display device according to claim 1, wherein the soft part and the hard part of the second impact absorption layer form a double-layered structure.

10. The foldable display device according to claim 9, wherein the soft part includes a base portion extending over both the first and the second region and a protrusion portion corresponding to the first region and protruding from the base portion, the protrusion portion being interposed between two portions of the hard part.

11. The foldable display device according to claim 1, wherein an interface between the first region and the second region is aligned to a boundary between adjacent pixel regions of the display panel.

12. The foldable display device according to claim 1, further comprising:
    a cover window disposed at the first surface of the display panel;
    a backplate disposed between the display panel and the impact absorption film;
    a first optical adhesive layer to attach the cover window with the display panel; and
    a second optical adhesive layer to attach the backplate with the display panel,
    wherein the first optical adhesive layer has an elastic modulus value less than an elastic modulus value of the display panel and an elastic modulus value of the cover window, and
    wherein the second optical adhesive layer has an elastic modulus value less than the elastic modulus value of the display panel and an elastic modulus value of the backplate.

13. The foldable display device according to claim 12, further comprising:
    a third optical adhesive layer for attaching the impact absorption film to the backplate,
    wherein the third optical adhesive layer has an elastic modulus value less than the elastic modulus value of the display panel and the elastic modulus value of the backplate.

14. The foldable display device according to claim 13, wherein at least one of the first to third optical adhesive layers has a thickness in a range of 100 to 300 micrometers.

15. The foldable display device according to claim 13, wherein at least one of the first to third optical adhesive layers has an elastic modulus in a range of $10^3$ to $10^4$ Pa.

16. The foldable display device according to claim 1, further comprising a touch panel disposed on the first surface of the display panel.

17. The foldable display device according to claim 1, wherein:
    the soft part of the second impact absorption layer is formed of polyurethane, thermoplastic polyurethane, silicon, or polydimethylacrylamide.

18. The foldable display device according to claim 1, wherein:
    the hard part of the second impact absorption layer is formed of a metallic material or a polymer.

* * * * *